United States Patent

Visser

[11] Patent Number: 5,672,322
[45] Date of Patent: Sep. 30, 1997

[54] METHOD, DRY MULTI-STAGE PUMP AND PLASMASCRUBBER FOR CONVERTING REACTIVE GASES

[75] Inventor: Jan Visser, Weert, Netherlands

[73] Assignee: Leybold AG, Cologne, Germany

[21] Appl. No.: 256,604

[22] PCT Filed: Jan. 18, 1993

[86] PCT No.: PCT/NL93/00017
§ 371 Date: Feb. 23, 1995
§ 102(e) Date: Feb. 23, 1995

[87] PCT Pub. No.: WO93/13851
PCT Pub. Date: Jul. 22, 1993

[30] Foreign Application Priority Data

Jan. 16, 1992 [NL] Netherlands ............... 9200076

[51] Int. Cl.⁶ ........................................... B01D 50/00
[52] U.S. Cl. .............. 422/168; 422/174; 417/244; 417/266; 417/345; 110/345
[58] Field of Search ................... 422/168, 169, 422/174; 417/266, 267, 201, 244; 110/345

[56] References Cited

U.S. PATENT DOCUMENTS 5,131,825  7/1992  Bachmann et al. ............... 418/1

FOREIGN PATENT DOCUMENTS

| 0 166 846 | 1/1986 | European Pat. Off. |
| 0 176 295 | 4/1986 | European Pat. Off. |
| 0 296 720 | 12/1988 | European Pat. Off. |
| 0 325 689 | 8/1989 | European Pat. Off. |
| 0 448 750 | 10/1991 | European Pat. Off. |
| 2640148 | 6/1990 | France . |
| 207 157 | 2/1984 | Germany . |
| 2 174 691 | 11/1986 | United Kingdom . |

OTHER PUBLICATIONS

Abstract of JP 58-006231 dated Jan. 13, 1983 –"Patent Abstracts of Japan", vol. 7, No. 69 (C-158), Mar. 23, 1983.

Abstract of JP 60-101544 dated Jun 5, 1985 –Database WPIL, Section Ch, Week 8529, Derwent Publications Ltd., London, GB; Class G08, AN 85-173743.

Primary Examiner—Christopher Kim
Attorney, Agent, or Firm—Merchant, Gould, Smith, Edell, Welter & Schmidt, P.A.

[57] ABSTRACT

Method for converting reactive gases which are sucked in at a low inlet pressure and are expelled at a higher outlet pressure by a dry multi-stage pump, in which method the reactive gases are physically and/or chemically converted into nonreactive components at a pressure situated between the inlet and outlet pressure, the conversion taking place, according to the invention, by means of gas discharge. The invention also relates to a dry multi-stage vacuum pump (3) and a plasma scrubber (4) which are particularly suitable for use in the method according to the invention.

9 Claims, 3 Drawing Sheets

METHOD, DRY MULTI-STAGE PUMP AND PLASMASCRUBBER FOR CONVERTING REACTIVE GASES

The invention relates to a method for converting reactive gases which are sucked in at a low inlet pressure and are expelled at a higher outlet pressure by a single dry multi-stage pump, in which method the reactive gases are physically and/or chemically converted into non-reactive components two stages of a dry multi-stage pump.

Such a method is disclosed in the European Patent Application No. 0 448 750 and is used, in particular, in the production of, for example, chips, LC screens and the like, or in the application of coatings to products of all kinds. In this case, a starting material is treated in a reactor with the aid of chemical or physical processes or a combination of such processes. Generally, a low to very low pressure (approximately $10^{-1}$-1000 Pa) prevails in the reactor and gases which are, for example, deposited on the starting material or are used in some other way by the treatment processes are supplied for the treatment of the surface of the starting material. For a number of reasons, such as, for example, to obtain a uniform distribution of the substances to be deposited on the surface of a wafer and to increase the production rate, such gases are supplied in excess. Generally, only approximately 15% of the gas supplied is used in the reactor, whereas the remainder and the gaseous reaction products are expelled again. The remaining gas or effluent is expelled into the atmosphere via a pipe, a vacuum pump, preferably only one multi-stage pump, and an expelling pipe system. The gases or gas mixtures used in the reactor, such as silane and ammonia, tetraethoxysilane, tungsten hexafluoride and hydrogen, dichlorosilane and ammonia, titanium chloride and dichlorosilane, and tetradimethyl-aminotitanium and ammonia are generally toxic, corrosive and flammable. The gaseous reaction products usually contain solids which may damage the vacuum pump and may block the expelling pipe system, which may result in explosions.

Solid dust particles are liberated in the treatment processes in the reactor and may be produced by the gases reacting in the pipe from the reactor to the pump and in the pump itself under the influence of the temperature prevailing therein, solid particles being released. In the case of silane, for example, glassy solid particles are produced by oxidation.

Because the pressure of the gases sucked in by the dry multi-stage pump is very low and the flow rate is high, only a few reactions occur in the first stages of the pump and few solids are released therein. However, when the pressure becomes higher in the subsequent pump stages and the dwell time of the reactive gases in the pump therefore becomes longer, said gases will react and large amounts of solid dust particles will be released which may damage the pump and may block the expelling pipe system situated downstream of the pump. The proposal made in the abovementioned European application provides a solution to these problems in that the reactive gases are converted with the aid of physical and/or chemical processes in a chamber designed for the purpose at a pressure situated between the intake pressure and the delivery pressure of the pump.

Such a method provides the advantage that the conditions prevailing in the cheer in which the reactive gases are converted into nonreactive gases and solids can be optimally controlled by the compression stage or stages to be carried out upstream of said conversion, and moreover that the conversion process cannot affect the processing conditions in the reactor because the chamber in which the conversion takes place is adequately shielded from the reactor by the compression stage or stages to be carried out between the reactor and the conversion chamber.

Another advantage is that the use of flushing gases, which are used to reduce the concentration of the reactive gases in the pump in order to reduce the reaction tendency, can be completely eliminated or can at least be reduced. Because the pressure in the first compression stage or stages is still very low and the dwell time of the reactive gases in said compression stages is very short, no solids, or only very few solids, will be released therein. Since, according to the invention, the reactive gases are purified after passing through the first compression stage or stages, the compression stages subsequent thereto, in which the pressure is higher and the dwell time of the gases is longer, are protected from contamination because only purified gases are compressed therein.

However, the European application mentions as physical and chemical processes, in the further elaboration of said physical and chemical gas treatment processes, high temperature exposure, adsorption, neutralisation and catalysis. For all these proposals, it is the case that they have a specification for specific reactive gases, with the exception of high-temperature exposure, auxiliary substances are used, and this involves costs and waste products which can frequently not be readily disposed of.

European patent application EP-A-0 296 720 discloses the use of a plasma scrubber for purifying the effluent of low pressure reactors, such as low pressure chemical vapor deposition reactors. The plasma scrubber is positioned between an initial pump, such as a Roots blower, and immediately ahead of a backing second stage vacuum pump, typically a mechanical pump. When the reactor is shut off from the effluent system the pressure in the plasma scrubber will drop to the specific end pressure of the second stage pump and the plasma will fall out. When the reactor is connected again with the effluent system the plasma will return after a period of time. In this period of time the second stage pump will be polluted and may be damaged by solid particles contained in the vapor coming from the reactor.

The object of the invention is to provide a method not having the above mentioned drawbacks.

For this pupose, the method of the type mentioned in the preamble is characterized in that the conversion between the stages of a dry multi-stage pump takes place by means of gas discharge.

Such a conversion, referred to in practice by the term plasma scrubbing, is particularly beneficial because the conversion can take place efficiently even at lower pressures and with a shorter dwell time than other purification processes, such as adsorption, neutralisation, high-temperature exposure and catalysis, and because no auxiliary materials have to be supplied and no residual materials are left over which, as is the case for purification based on, for example, adsorption, still have to undergo a treatment before they can be disposed of. The invention is particularly advantageous if use is made of only one single pump which spans the total pressure difference between the processing chamber and the expelling pipe system. The use of only one pump provides the advantage that only a small space is occupied and, in addition, that the procurement and maintenance costs of a single pump are obviously lower than those of a plurality of pumps.

European Patent Application No. 0 448 750 also proposes a dry multi-stage vacuum pump in which the first stage is provided with an intake opening and the last stage is provided with a delivery opening, at least one of the pump stages being provided with an outlet duct and the stage subsequent thereto with an inlet duct and the outlet duct being connected via a reaction chamber to the inlet duct. Such a dry multi-stage pump is particularly suitable for use in the method if, according to a more detailed elaboration of the invention, the reaction chamber is a gas discharge chamber which is situated in a plasma scrubber.

The dry multi-stage pump according to the invention provides the advantage that the specifications of the pump can be determined in such a way that the plasma scrubber can be connected between two stages in which the conditions, such as, for example, pressure and flow rate, are optimum for converting the reactive gases with the aid of gas discharge. The service life of the pump is appreciably prolonged by the plasma scrubber and contamination of the expelling pipe system is prevented. At the same time, conversion with the aid gas discharge is efficient for very many types of reactive gases and no auxiliary materials are used, as is the case for adsorption, catalysis, neutralisation and the like.

The dry multi-stage pump according to the invention is in further elaboration provided with a gas discharge chamber bounded by side walls and a top wall, with means for forming a plasma in the gas discharge chamber and with a collecting tank which is disposed beneath the gas discharge chamber and is connected detachably to the side walls thereof and which is in open communication with the gas discharge chamber, the gas discharge chamber being provided with a tubular element which extends from the top of the gas discharge chamber in the direction of the collecting tank, the gas discharge chamber being provided with a gas inflow opening and a gas outflow opening, one of which openings opens inside and the other outside the tubular element in the discharge chamber, all these features being such that the gas to be purified is forced to flow in its entirety through the plasma formed in the gas discharge chamber by the means serving that purpose and such that the gas to be purified on its path from the inflow to the outflow opening is changed in direction, and the dimensions of the tubular element, the gas discharge chamber and the collecting tank being matched to one another in such a way that the solid particles released in the gas discharge chamber or present in some other way in the gas to be purified fall downwards into the collecting tank, whereas the gas flows through the plasma scrubber.

The advantage of said such scrubber in combination with the positioning thereof between the stages of a dry multi-stage pump is that filters for retaining the solid particles, which are necessary in the known plasma scrubbers positioned upstream of the pump, can be eliminated. After all, the solid particles are precipitated by gravity as a result of the particular flow pattern in the scrubber and the relatively low flow rate with which the gas to be purified and the purified gas pass through the plasma scrubber, which flow pattern is enforced by the tubular element and the positioning of the inflow and outflow openings. Another advantage of said plasma scrubber is that the gas to be purified passes through the gas discharge chamber via a long path, with the result that the gas to be converted is contained for a relatively long period in the conversion chamber, as a result of which the conversion is able to take place efficiently. According to a more detailed elaboration of the invention, such a particular flow pattern can be obtained with a plasma scrubber in which the gas inflow opening opens into the top part of the chamber which is bounded by the tubular element, in which the gas outflow opening opens into the upper part of the chamber which is bounded on the outside by the side wall or walls of the gas discharge chamber and is bounded on the inside by the tubular element, in which the tubular element extends somewhat beyond the plane in which the joint of the side walls bounding the gas discharge chamber and the collecting tank is situated, and in which the cross-sectional area through the collecting tank parallel to said plane is greater than a cross-sectional area, parallel thereto, through said gas discharge chamber.

In such a plasma scrubber, the reactive gases flow from the uppermost section of the gas discharge chamber via the inside of the tubular element in the direction of the collecting tank having the larger cross section. While the gases are flowing through the gas discharge chamber, they are converted into nonreactive gases and solids. In the collecting tank, the flow direction of the gases reverses and the solid dust particles contained in the gas flow drop downwards. The gases then flow back upwards in the direction of the gas outflow opening via the chamber which is bounded by the side walls of the gas discharge chamber and the outside of the tubular element. Because the cross-sectional area is greater in the collecting tank than in the gas discharge chamber, the flow rate in the collecting tank will be lower, with the result that the chance of particles being entrained by the gas flow is minimised. The collecting tank therefore forms a region having a stagnant flow rate (stagnant flow area), which is comparable to a settling tank.

In a more detailed elaboration of the invention, the material from which the tubular element is manufactured may be dielectric. A tubular element manufactured from dielectric material attracts the freely floating dust particles by electrostatic forces. Once a layer of dust particles has collected on the dielectric material, said layer breaks loose and falls downwards into the collecting tank.

Furthermore, in a more detailed elaboration of the invention, the means for forming a plasma in the gas discharge chamber are constructed as an electrically conducting coil which is disposed inside the tubular element and connected to a high-frequency electrical source. Such a coil provides the advantage that a potential difference can be created between the top and the bottom thereof, for example if the uppermost winding is connected to earth and the lowermost winding is connected to a high-frequency source, with the result that the plasma formed by the coil is formed more at the bottom of the coil, the solid particles released in the plasma not being able, as a result, to diffuse readily into the previous pump stage via the gas flow inlet. A further advantage of a coil compared with, for example, plate electrodes is that it has a smooth shape, as a result of which fewer undesirable discharges (spurious discharges) occur.

It is particularly beneficial if, according to a more detailed elaboration of the invention, the coil is manufactured from a pipe and can be cooled by means of a coolant flowing through the pipe. Apart from the gravitational forces and possibly the dielectric forces which are exerted on the particles, a cooled pipe exerts thermal forces on the particles, as a result of which particles will precipitate on the coil surface as a result of diffusion. Fluctuations in the temperature of the coil ensure that the coil expands and contracts, as a result of which the layer formed by the particles on the coil periodically breaks off and falls downwards into the collecting tank.

In the case of some reactive gases, it may be necessary to supply an auxiliary gas in order to promote the conversion. For this purpose, according to a more detailed elaboration of the invention, the plasma scrubber may be provided with a gas supply pipe which opens into the gas discharge chamber inside the tubular element.

If the solid particles are very light, it may be particularly beneficial, according to a more detailed elaboration of the invention, if an electrostatic filter is disposed inside the collecting tank in such a way that the gases pass through it en route to the chamber bounded by the side walls of the gas discharge chamber and the tubular element. Such a filter guarantees that all the solid particles are removed from the gas. If the particles have formed a thick layer on the electrostatic filter as a result of deposition, this layer will come loose and end up in the collecting tank.

To illustrate the invention, an application example of a dry multi-stage vacuum pump according to the invention and an exemplary embodiment of the plasma scrubber will be described by reference to the drawing.

DETAILED DESCRIPTION

Figure 1:
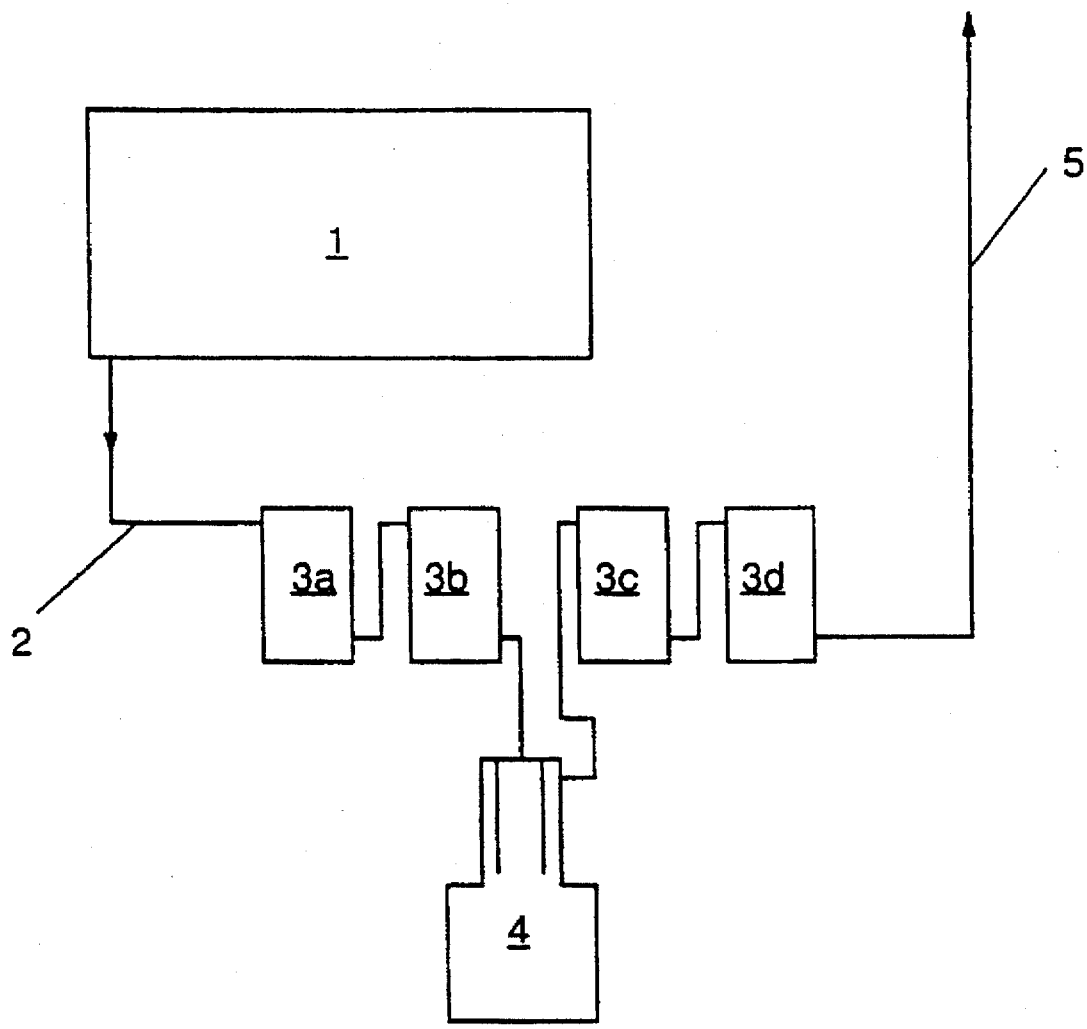
FIG. 1 shows a diagrammatic flow chart of an example of an apparatus in which the method, a dry multi-stage pump and a plasma scrubber according to the invention can be used.

The apparatus shown in FIG. 1 has a processing reactor 1 has a processing reactor 1 for treating wafers or similar semiconductor products by means of chemical, thermal or physical processes. The processing conditions in the reactor 1 can be accurately controlled. To treat the wafers, processing gases, only approximately 15% of which is consumed by the processes in the reactor, are supplied to the reactor 1 via a feed pipe (not shown). The remainder of the processing gases and the gaseous reaction products is sucked off via a pipe 2 by a dry multi-stage pump 3 which is shown here diagrammatically, for the sake of clarity, in four separate blocks 3a, 3b, 3c, 3d, but which can in reality be constructed as a single unit. The dry multi-stage pump 3, which is preferably a dry multi-stage claw-type pump, compresses the gas, after which the gas is expelled, for example, into the atmosphere via an expelling pipe system 5. The generally toxic processing gas, which frequently contains solids and from which solids may be formed by chemical reactions, for example by oxidation in the relatively hot pump 3, should be purified before it is discharged. For this purpose, according to the invention, a plasma scrubber 4 is incorporated between, in this case, the second stage 3b and the third stage 3c of the dry multi-stage pump 3. This arrangement guarantees that the reactor 1 is adequately shielded from the plasma scrubber 4 by the first two stages 3a, 3b of the multi-stage pump 3, with the result that the scrubbing has no effect on the processing conditions in the reactor 1. At the same time, it is possible to design the pump 3 in such a way that the ideal pressure and flow rate for plasma scrubbing can be created after the gas leaves the second stage 3b. In the first stage 3a and second stage 3b of the pump 3, only a few reactions occur as a result of the low pressure and the high flow rate of the gas, with the result that the first stage 3a and second stage 3b of the pump 3 will not, or virtually not, become contaminated. After the gas leaves the second stage 3b, it is purified in the plasma scrubber 4, with the result that the third stage 3c and fourth stage 3d of the pump 3 and the expelling pipe system 5 connected thereto will not become contaminated.

Figure 2:
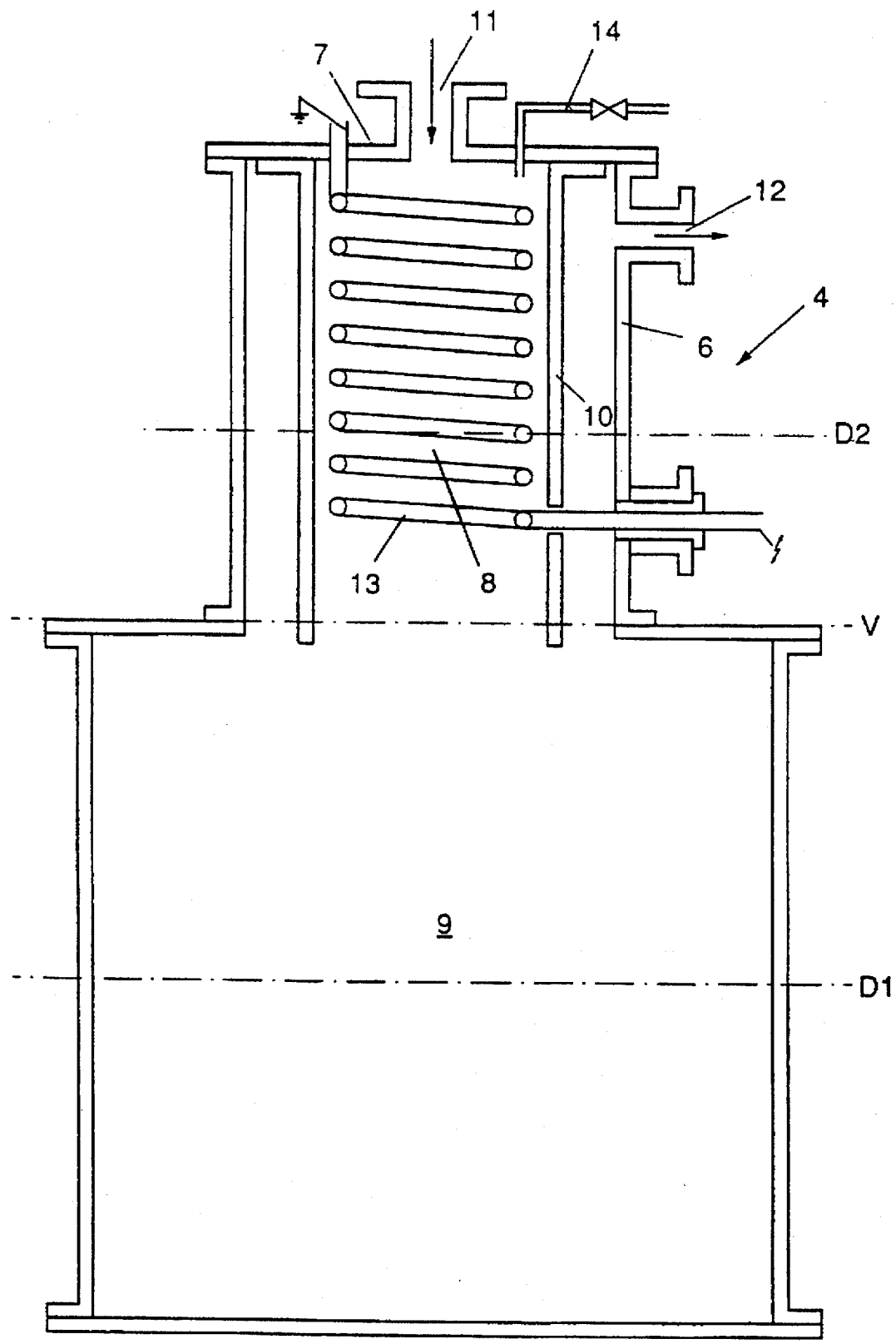
FIG. 2 shows a cross-sectional view of an exemplary embodiment of the plasma scrubber.
Figure 3:
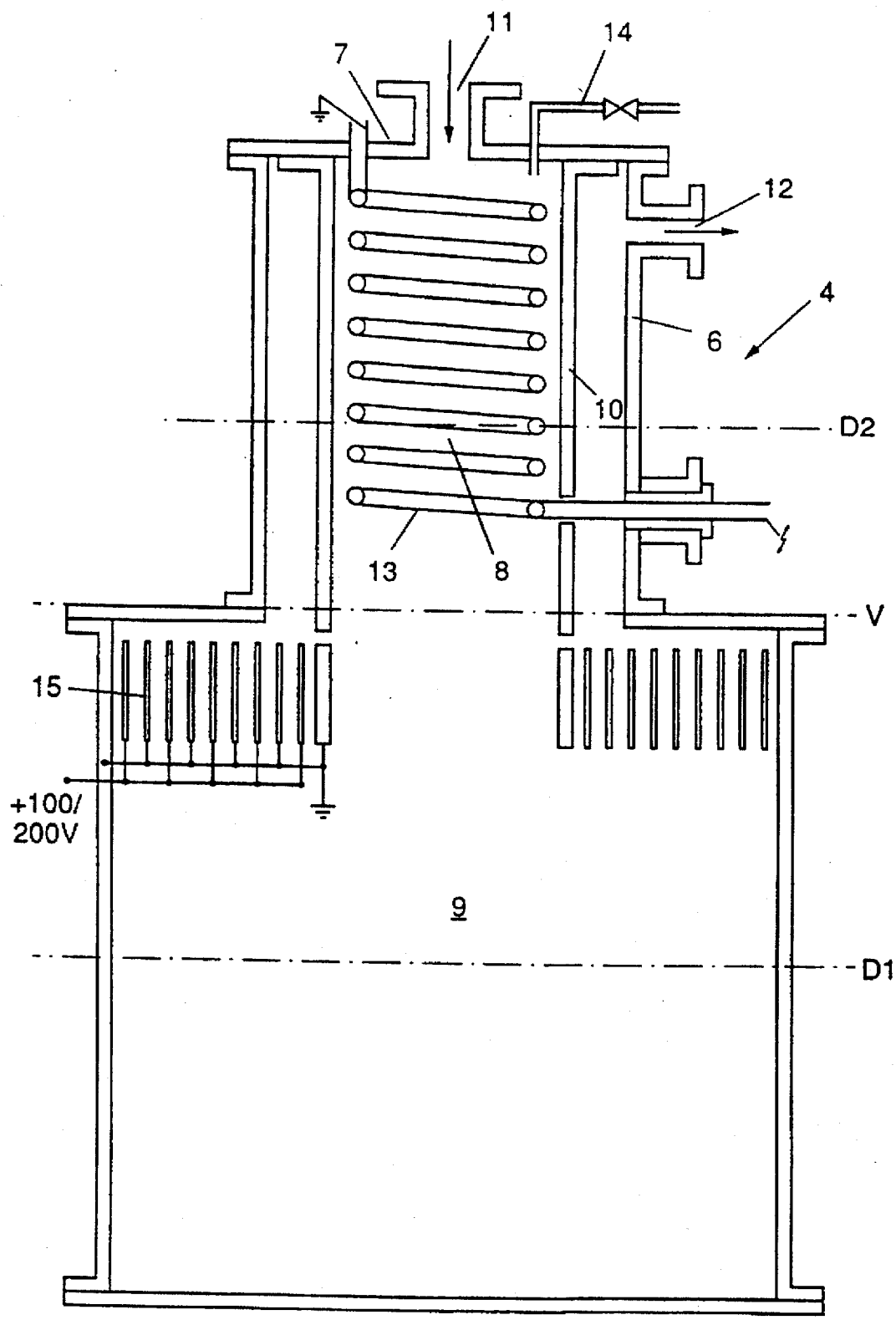
FIG. 3 shows a similar cross-sectional view of an exemplary embodiment of the plasma scrubber provided with an electrostatic filter.

A particularly suitable plasma scrubber 4 developed especially for this arrangement is shown in FIG. 2. The known plasma scrubbers are always disposed upstream of the pump. As a result of the low pressure which prevails at that point and of the high flow rate, the reactions in such a conventionally disposed plasma scrubber will not be complete and it is necessary to use filters which retain the solid dust particles originating from the reactor and produced during scrubbing. The plasma scrubber 4 shown in FIG. 2 efficiently converts the reactive gases as a result of the higher pressure and the longer dwell time in the plasma scrubber 4 and the use of dust filters can be eliminated.

The exemplary embodiment of the plasma scrubber 4 shown, which is particularly suitable for use in the case of the dry multi-stage pump 3 according to the invention, is provided with a gas discharge chamber 8 bounded by side walls 6 and a top wall 7 and with means for forming a plasma in the gas discharge chamber 8, a collecting tank 9 which is arranged underneath gas discharge chamber 8 and is connected detachably to the side walls 6 thereof being in open communication with the gas discharge chamber 8. The gas discharge chamber 8 is provided with a tubular element 10 which extends from the top of the gas discharge chamber 8 in the direction of the collecting tank 9 and is preferably manufactured from dielectric material, such as, for example, quartz. The gas discharge chamber 8 is provided with a gas inflow opening 11 which opens into the upper part of the chamber bounded by the tubular element 10, and with a gas outflow opening 12 which opens into the upper part of the chamber which is bounded on the outside by the side wall or walls 6 of the gas discharge chamber 8 and is bounded on the inside by the tubular element 10. The gas to be purified is thus forced to flow in its entirety through the plasma formed by the means serving this purpose into the gas discharge chamber 8. The tubular element 10 extends somewhat beyond the plane V in which the joint of the side walls 6 bounding the gas discharge cheer 8 and the collecting tank 9 is situated, and the cross-sectional area D1 through the collecting tank 9 parallel to said plane V is larger than a similar cross-sectional area D2 through said gas discharge chamber 8.

With such a configuration, the solid particles which are released in the gas discharge chamber 8 or are present in some other way in the gas to be purified fall downwards into the collecting tank 9, whereas the gas flows through the scrubber 4 and is fed via the outflow opening 12 to the subsequent stage 3c of the dry multi-stage pump 3.

The means for forming a plasma in the gas discharge cheer 8 are constructed as an electrically conducting coil 13 which is disposed inside the tubular element 10 and is connected to a high-frequency electrical source (for example 13.56 MHz) and which is preferably manufactured from a pipe and can be cooled by means of a coolant flowing through the pipe. Such a cooled coil 13 provides the advantage that the dust particles are collected in the scrubber 4 not only with the aid of gravitational and dielectric forces but that thermal forces are also exerted on the particles. Thermal forces occur in the case of local temperature differences, as a result of which the particles flow towards the coil 13 by means of diffusion and deposit thereon.

As shown, the plasma scrubber 4 is provided with a gas feed pipe 14 which opens into the gas discharge cheer 8 inside the tubular element 10. Auxiliary gases which promote the conversion of the reactive gases are supplied by this second gas feed pipe 14.

In an embodiment which is simple from a manufacturing point of view, the tubular element 10 and the side wall 6 of the gas discharge chamber 8 may be constructed as two concentrically disposed, hollow cylindrical elements.

If the solid particles are particularly light, it may be advantageous if an electrostatic filter 15 is disposed in the collecting tank 9 in such a way that the gases pass through it en route to the cheer bounded by the side walls 6 of the gas discharge chamber 8 and the tubular element 10. Across the electrostatic filter, which is constructed, for example, as an electrically conducting plate filter, a voltage difference of approximately 100–200 V is created between the plates. Small particles which might possibly be entrained by the gas flow are removed from the gas flow by said filter.

It is clear that the invention is not restricted to the exemplary embodiment described but that various modifications are possible within the scope of the invention. Thus, the means for forming a plasma in the gas discharge cheer of the plasma scrubber may, for example, be constructed as a coil disposed outside the gas discharge chamber, the side walls of the gas discharge cheer and the tubular element being manufactured from dielectric material or said means being formed by plate electrodes disposed in the gas discharge chamber.

The essential point is that reactive gases pumped through a dry multi-stage pump are purified by means of gas discharge at a pressure which is situated between the intake pressure and the delivery pressure of the dry multi-stage pump.

I claim:

1. Method for treating reactive gases passing through a single dry multi-stage pump, comprising the steps of:

converting the reactive gases into non-reactive components by a gas discharge in a reaction chamber comprising a collection tank detachably sealed to the side walls of the reaction chamber forming a gas discharge chamber with the side walls and top wall, the collecting tank being in open communication with the reaction chamber, and a plasma generator positioned within the gas discharge chamber, the reaction chamber positioned between two stages of the dry multi-stage pump; and collecting solid particles produced by the converting step in the collecting tank disposed below the reaction chamber.

2. A dry multi-stage vacuum pump, comprising:

a plurality of pump stages; and a reaction chamber connected between two adjacent pump stages of the plurality of pump stages, the reaction chamber comprising side walls, a top wall connected to the side walls, a collection tank detachably sealed to the side walls of the reaction chamber forming a gas discharge chamber with the side walls and top wall, the collecting tank being in open communication with the reaction chamber, a plasma generator positioned within the gas discharge chamber, a tubular element extending from an upper portion of the reaction chamber towards the collecting tank, a first gas flow connection providing an opening in the top wall within the tubular element, and a second gas flow connection providing an opening on one of the outer walls outside the tubular element;

wherein gas passing through the reaction chamber is forced through a plasma formed in the gas discharge chamber by the plasma generator so that gas passing between the first and second gas flow connections is changed in direction, and solid particles released in the gas discharge chamber, fall downwards into the collecting tank.

3. Dry multi-stage vacuum pump according to claim 2, wherein the first gas flow connection opens into the upper portion of the reaction chamber bounded by the tubular element, the second gas flow connection opens into a portion of the reaction chamber bounded by the side walls of the reaction chamber and the tubular element, the tubular element extending beyond a plane formed by a joint between the side walls and the collecting tank, and a first cross-sectional area of the collecting tank parallel to said plane is greater than a cross-sectional area of the reaction chamber parallel to the first cross-sectional area.

4. Dry multi-stage vacuum pump according to claim 2, wherein the tubular element is manufactured from nonconducting material.

5. Dry multi-stage vacuum pump according to claim 2, wherein the plasma generator in the reaction chamber comprises an electrically conducting coil disposed inside the tubular element and connected to a radio-frequency electrical source.

6. Dry multi-stage vacuum pump according to claim 5, characterized in that the electrically conducting coil comprises a pipe and is coolable by flowing coolant therethrough.

7. Dry multi-stage vacuum pump according to claim 2, wherein the reaction chamber further comprises a gas feed pipe opening into the gas discharge chamber inside the tubular element.

8. Dry multi-stage vacuum pump according to claim 2, wherein the tubular element and the side walls of the reaction chamber comprise two concentrically disposed, hollow cylindrical elements.

9. Dry multi-stage vacuum pump according to claim 2, wherein the gas discharge chamber further comprises an electrostatic filter disposed in the collecting tank so that passing from inside the tubular element to outside the tubular element are forced to pass through the electrostatic filter.

* * * * *